Dec. 14, 1926.  
J. McCARTY  
1,610,870  
BROACHING AND SWAGING TOOL  
Filed Sept. 4, 1924
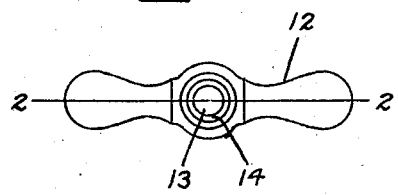
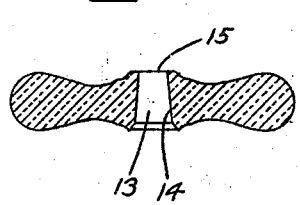
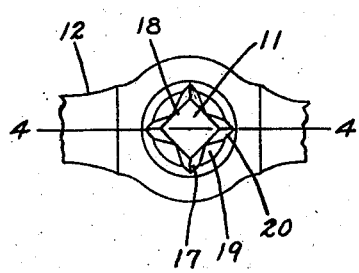
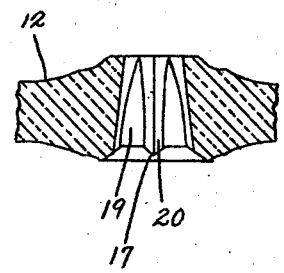
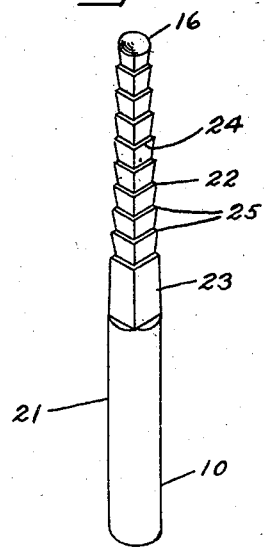
Inventor  
James McCarty  
By Louis M. Schmidt  
Atty.

Patented Dec. 14, 1926.

1,610,870

UNITED STATES PATENT OFFICE.

JAMES McCARTY, OF WATERBURY, CONNECTICUT.

BROACHING AND SWAGING TOOL.

Original application filed June 13, 1921, Serial No. 477,122. Divided and this application filed September 4, 1924. Serial No. 735,752.

My invention relates to improvements in broaching and swaging tools of the form that is adapted particularly for forming the sockets in the blanks for faucet handles after the manner that is shown and described in my application that was filed June 13, 1921, Serial No. 477,122, of which this is a division involving a tapered form in combination with a non-circular form of cross-section for receiving the tapered stem of a faucet, and the object of my improvement is to produce in a single tool a combination of a broach and a swage so as to be adapted to form by an operation involving a single movement, with the tool inserting in an opening in the form of a simple opening of tapered form with a circular form of cross-section, of the finished socket, the tool being substantially like that shown and described in the application mentioned.

In the accompanying drawing:—

Figure 1 is a bottom view of a blank for a faucet handle having an opening with a tapered form for the side walls, such as is adapted to be operated upon by means of my improved broach-swaging tool.

Figure 2 is a sectional view on the line 2—2 of Fig. 1.

Figure 3 is a bottom view on an enlarged scale of the finished socket that is formed by the use of my improved tool.

Figure 4 is a sectional view on the line 4—4 of Fig. 3.

Figure 5 is an isometric view of my improved broach-swaging tool.

My improved broach-swaging tool 10 is used to form the socket 11 in a faucet handle 12 to receive the stem for the moving part of the faucet, said stem being of tapered form and having a square form of cross-section.

The faucet handle 12 is provided with an opening 13 for the reception of my improved tool that is formed in any proper manner, as by drilling and reaming, so as to have a tapered or conical form for the side wall 14. As to details, the taper for the side wall of the stem is about five degrees, making a total of ten degrees for the angle for the two opposite side walls relatively one to the other.

As to the tapered or conical side wall 14 of the reamed opening 13, the taper for one side is ten degrees and the total for the two opposite portions on all sides is twenty degrees. Some departure from the exact values given is permitted.

The size of the opening 13 at the small end 15 is such such as to permit the entry of the tip end 16 of the tool 10, and which is about equal in diameter to the distance across the stem between opposite sides at the small end thereof.

The finished socket 11 has corner-seats 17 for the entire effective length, without interruption, that have the requisite taper to fit the corners on the stem.

At the small end 18 of the socket 11 there is provided a substantially full square form that corresponds generally in size to that of the small end of the stem, wherefore, the finished handle 12 when viewed from the upper side presents the same appearance as those heretofore in common use.

The side wall structure of the socket 11 for the most part, however, is of skeleton form involving cutaway portions 19 intermediate the corner-seats 17 by reason of the excess of the taper of the wall 14 of the reamed hole 13 over that of the stem and the effective side wall in the socket 11 that cooperates with said stem.

The effective side wall mentioned is composed of diminutive flat portions 20 that meet to form the corner-seats 17. Thus for each effective side, of skeleton form, there are the two diminutive flat portions 20 that are adjacent and these are separated by the intermediate cutaway portion 19 that was cut out by the reamer.

The provision of the cutaway portions 19 serves to relieve and to reduce the work to be done by the tool 10 to be described in forming the socket for the stem.

Said tool 10 comprises a shank 21 at one end, a tip 16 at the other end, and intermediate said ends has a broach portion 22 adjacent to and merging with the tip 16 and a swage portion 23 that merges with the broach portion 22 at one end and with the shank 21 at the other end.

The broach portion 22 has a series of cutting edges or teeth 24 that increase in size from the tip 16 toward the shank or head 21 up to the two terminal teeth 25 at the inner end. Said terminal teeth 25 serve as finishing teeth and to this end are of the same size and correspond in size to that of the square hole desired.

The swage portion 23 is of square formation and tapered form, being the counterpart of the stem and the effective socket that is defined by the corner-seats 17.

In use, the tool described is forcibly applied to an opening 13 as described so that the operation of the broach portion 22 is followed instantaneously by that of the swage portion with the result that there is formed the socket structure 11, as described, and which socket structure comprises as the essential and important feature a seat for the faucet handle stem and which seat is defined by the corner-seats 17, also as described.

I claim as my invention:—

A broaching and swaging tool comprising a bar-like structure having a broach portion and a swage portion that merge one with the other, said swage portion having walls that flare outwardly from the junction with said broach portion and being of square form of cross-section so as to operate as a forming tool for forming a seat in a faucet handle blank for the stem of a faucet.

JAMES McCARTY.